United States Patent Office 3,265,733
Patented August 9, 1966

3,265,733
PRODUCTION OF OXIMES OF CYCLO-
ALIPHATIC KETONES
Helmut Doerfel and Paul Raff, Ludwigshafen (Rhine),
Germany, assignors to Badische Anilin- & Soda-Fabrik
Aktiengesellschaft, Ludwigshafen (Rhine), Germany
No Drawing. Filed Aug. 23, 1963, Ser. No. 304,213
Claims priority, application Germany, Sept. 1, 1962,
B 68,678
6 Claims. (Cl. 260—566)

This invention relates to a new process for the production of oximes of cycloaliphatic ketones.

It is known that oximes of cycloaliphatic ketones have great importance as initial materials for the production of polyamides. For example cyclohexanone oxime is prepared industrially by reaction of cyclohexanone with an aqueous solution of a hydroxylammonium salt, neutralization of the reaction mixture and separation of the cyclohexanone oxime from the aqueous phase.

This method gives good results in the case of reactive and at least moderately well water-soluble cycloalkanones, such as cyclohexanone, cycloheptanone or cyclooctanone. It cannot be directly adopted however for oximation of practically water-insoluble and little reactive higher cycoalkanones having twelve or more carbon atoms. Thus for example reaction of cyclododecanone with aqueous hydroxylammonium salt solutions gives yields of cyclododecanone oxime of less than 20% (cf. German printed application No. 1,081,884, column 1, paragraph 1). The different behavior of lower cycloalkanones, such as cyclohexanone and higher cycloalkanones, such as cyclododecanone, in their reaction with aqueous hydroxylammonium salt solutions may also be seen from the following comparisons: Whereas in German Patents Nos. 857,375 and 888,693, U.S.A. Patents Nos. 2,270,204, 2,756,258, 2,820,825 and in numerous other publications, the practically quantitative oximation of cyclohexanone with aqueous hydroxylammonium salt solutions is recommended at temperatures of 0° to 65° C., cyclododecanone reacts only very slowly and incompletely under the same conditions at these temperatures.

For the production of particularly pure cyclohexanone oxime which is to be stable for a long period without discoloration and which can be processed into pure polyamides, German printed application No. 1,042,575 specifies a pH value of 2.5 to 3, U.S.A. Patent No. 2,820,825 a pH value of 3.4 to 3.5, and German Patent No. 888,693 and U.S.A. Patent No. 2,270,204 a pH value of 4. In these and in other publications the emphasis is always on the importance of working in acid medium. Cyclododecanone does not react at all with aqueous hydroxylammonium salt solutions at a pH up to 4 even at temperatures higher than 100° C.

In the production of higher cycloalkanone oximes it is however very desirable that the crude products should be as free as possible from initial material. Higher cycloalkanone oximes cannot be economically purified by distillation because they boil at high temperatures and with decomposition and because the boiling points of the ketone and the oxime prepared therefrom differ considerably less than is the case with the lower cycloalkanone oximes. Purification by recrystallization is troublesome and attended by considerable technical expense. For the production of the corresponding higher lactams, the unpurified oximes should if possible be subjected to the Beckmann rearrangement. Under the conditions of the Beckmann rearrangement, the ketones contained in the oximes resinify and worsen the yield and quality of the lactam thus prepared. For example if cyclododecanone oxime contains 10% of cyclododecanone, production of laurolactam therefrom is hardly worthwhile. A content of 2% of cyclododecanone in cyclododecanone oxime worsens the yield of pure laurolactam prepared therefrom by as much as 2 to 4% as compared with an initial product which is free from ketone. It is only a ketone content of less than 0.5% that is scarcely noticeable in the preparation of lactam. Such slight contamination of higher cycloalkanone oximes by the corresponding cycloalkanones is not indicated by a depression of the melting point of the oxime. Accurate results are however obtainable by gas chromatographic methods by which amounts of ketone as small as 0.05% can be detected in the oxime.

According to Helv. Chim. Acta, 32 (1949), 547, higher cycloalkanones are reacted with hydroxylammonium chloride in methanol. In this case the ketone and the oximation agent are therefore present in one phase. The process of German printed application No. 1,081,884 also operates in a homogeneous system in which cyclododecanone is reacted with a hydroxylammonium salt in acid medium in the presence of water and an inert organic solvent miscible with water. Coemployment of a neutralizing agent is not necessary. According to Liebig's Annalen, vol. 586 (1954), 1–29, higher cyclic ketones, namely benzocyclonones are reacted in a homogeneous aqueous-alcoholic medium with the addition of a neutralizing agent.

The use of a solvent which is miscible with water makes the industrial production of the oxime more expensive however because separation of this solvent from the aqueous phase involves considerable equipment cost and a certain amount of loss.

It is an object of the present invention to provide a process by which higher cycloaliphatic ketones can be converted into the corresponding oximes with very high conversions. Another object of the invention is to provide a process by which higher cycloaliphatic ketones can be converted into the corresponding oximes to such an extent that the latter can, without purification, be converted into the corresponding lactams without the yield being appreciably reduced owing to the presence of ketone in the oxime. Yet another object of the invention is to provide a process by which oximes of higher cycloaliphatic ketones can be prepared in good yields without using a solvent to produce a homogeneous reaction medium. Other objects of the invention will be apparent from the following detailed description.

In accordance with this invention these objects are achieved in the reaction of cycloaliphatic ketones having at least twelve carbon atoms with hydroxylamine in an aqueous heterogeneous reaction mixture by making provision for the presence in the aqueous phase of at least 10% by weight of salt upon completion of the reaction and carrying out the reaction at 50 to 150° C. and a pH between 6 and 14.

Higher cycloalkanones, such as cyclododecanone, cyclotetradecanone, cyclooctadecanone and cyclodocosanone can be converted according to the new process in excellent yields into the corresponding oximes which can be rearranged into lactams without purification. The process is especially important in the manufacture of cycloalkanone oximes with 12 to 16 carbon atoms.

It is essential that the aqueous phase should contain at least 10% by weight of salt after the reaction has ended. Conversion is insufficient when the salt content is less than the said amount. The upper limit for the salt concentration is the saturation concentration. The aqueous phase should not be supersaturated with salt as otherwise solid salt may be precipitated during the reaction. This does not prevent reaction of the cycloalkanone, but is troublesome in operation.

The beneficial effect of a salt content in the aqueous phase is contrary to expectations. The art suggested that appreciable contents of salt in the aqueous phase should be avoided since salts are known to reduce the solubility of organic compounds in water, a fact upon which the salting-out methods are based. A salt content in the aqueous phase reduces the relatively low solubility of cycloalkanone and inhibits the reaction in the aqueous phase.

The nature of the salt is not critical. The only important point appears to be that a certain minimum amount of ionic constituents is present in the aqueous phase. Sufficiently soluble inorganic or organic salts are therefore suitable, e.g., sodium chloride, potassium sulfate, ammonium chloride, N-methylammonium sulfate, disodium hydrogen phosphate, barium chloride, magnesium sulfate, sodium acetate, potassium benzoate, sodium sulfate, ammonium sulfate, calcium chloride, and sodium propionate. It is expedient to use sufficiently soluble salts derived from ammonia, alkali metal or alkaline earth metal salts on the one hand and hydrogen chloride, sulfuric acid, phosphoric acid and aliphatic monocarboxy fatty acids with 1 to 4 carbon atoms on the other hand.

The hydroxylamine is advantageously used in the form of an aqueous solution of a salt, for example the sulfate or chloride. Hydroxylamine is then liberated from the salt in the reaction mixture by adding a base. In this case the salt which is in the aqueous phase of the reaction mixture is formed from the base and the anion of the hydroxylammonium salt. The concentration of the salt in the aqueous phase may be determined by the concentration of the aqueous solution of the hydroxylammonium salt or, if the base is added in aqueous solution or suspension, also by the concentration of the base in this solution or suspension. It is possible for example to use 15 to 80% by weight aqueous hydroxylammonium salt solutions and 25 to 50% by weight aqueous caustic alkali solutions or concentrated aqueous or anhydrous ammonia. Other suitable bases for liberating hydroxylamine are methylamine, alkaline earth metal hydroxides and bases which form water-soluble salts with the anion of the hydroxylammonium salt. Instead of liberating hydroxylamine from a salt in the reaction mixture, it is naturally also possible to start from an aqueous hydroxylamine solution. In this case some other provision must naturally be made for the aqueous phase of the reaction mixture to have the said minimum concentration of salt, for example by using a hydroxylamine solution containing a salt. It is also possible to use aqueous solutions of hydroxylamine sulfonates which are formed by the action of alkali metal bisulfates on alkali metal nitrites, if necessary after partial hydrolysis, for the reaction according to this invention.

Hydroxylamine and ketone may be used in stoichiometric amounts, but it is preferable to use an excess of the first mentioned component, for example of up to 30 mole percent.

Oximation proceeds under otherwise optimum conditions with appreciable speed even at room temperature. In the interests of a high reaction rate it is however advantageous to work at a temperature between 50° and 150° C., particularly between 70° and 120° C. If no solvent is used, it is advantageous to work at a temperature above the melting point of the ketone. It has been found that the most favorable oximation temperature increases with increasing molecular weight of the cyclic ketone. If the temperature exceeds 100° C. it is necessary in each case to test whether the oxime has sufficient thermal stability.

It is an essential feature of the process according to this invention that the process should be operated at a pH value between 6 and 14, preferably between 7 and 12. No oximation whatever takes place at pH 1 to 4 even when otherwise the optimum reaction conditions are maintained. At pH 5 to 6 the reaction proceeds slowly and not sufficiently completely. At pH 7 to 12 it proceeds rapidly and practically completely. These findings are surprising because according to the statements in Example 1 of German printed application No. 1,081,884, the oximation reaction proceeds more completely in an aqueous-alcoholic homogeneous system in the acid range (pH 1.5 to 4) than in the neutral range. Moreover it is expressly stated in U.S.A. Patent No. 2,270,204 that the speed of oximation generally slows down in the neighborhood of pH 7. In a large number of other prior art oximation processes, an acid medium is always prescribed.

The process according to the invention may be carried out without solvent and then yields oximes which contain, under optimum conditions, 1.5 to 2.5% of ketone. Surprisingly, by adding 20 to 150 parts by weight of an inert organic solvent which is not miscible with water and which boils at above 70° C. preferably above 100° C., to 100 parts of ketone, the conversion in the oximation reaction is further increased. Thus for example by the action of an aqueous hydroxylammonium sulfate solution on a mixture of 1 part of cyclooctane and 2 parts of cyclododecanone under optimum oximation conditions, a cyclododecanone oxime is prepared which contains only 0.1% of cyclododecanone, has a purity of at least 99.8% and from which very pure laurolactam can be prepared in particularly high yields. Especially useful solvents are aliphatic, cycloaliphatic, araliphatic or aromatic hydrocarbons which may be substituted by 1 to 4 chlorine atoms. Suitable solvents are for example benzene, toluene, xylene, ethylbenzene, cyclohexane, methylcyclohexane, cyclododecane, cyclooctene, n-octane, hydrocarbon mixtures boiling between 100° and 150° C. obtained from petroleums, chlorobenzene, trichloroethylene and carbon tetrachloride.

Although the oximation of p-menthone in the presence of methylene chloride as solvent is described in German Patent No. 888,693, and in U.S.A. Patent No. 2,270,204,, it is merely to avoid the reaction of the p-menthone which is solid under the reaction conditions therein specified. In the case of the process according to this invention however oximation is advantageously carried out under conditions in which the ketone is molten. Nevertheless, an improvement in quality of the oxime can be achieved by adding an inert solvent. The stated amount of solvent is in general not sufficient to dissolve the whole of the oxime at the reaction temperature.

After the oximation reaction is over, more than the optimum amount of solvent may be added, for example an amount that will dissolve the whole of the oxime therein. The oxime may then be more readily separated as a solution from the aqueous phase. This method is to be recommended particularly when preparing oximes which melt at above the oximation temperature and the process is being carried out continuously.

The process according to this invention may be carried out for example by heating the cycloaliphatic ketone, the aqueous solution of the hydroxylammonium salt and any solvent used while stirring, then liberating the hydroxylamine by adding a base and then allowing the oximation to take place by keeping the reaction mixture for some time, for example one to two hours, at the reaction temperature and at the specified pH value. In another embodiment of the process, the ketone is introduced into the aqueous hydroxylamine solution (if desired prepared in situ) and the procedure described above is then followed.

After the reaction is over and the reaction mixture has been cooled, the oxime is usually present in crystallized form and can be separated from the aqueous phase in the usual way. After it has been washed with water and dried, it is very pure and may be used direct for example for the production of the corresponding lactam.

The oximes of alicyclic ketones having more than fourteen carbon atoms melt at below 80° C. and are thus present in liquid form at the oximation temperature. In this case the reaction mixture is worked up most simply by separating the aqueous phase from the molten oxime. The aqueous phase contains practically no organic substances and the oxime is very pure after it has been dried.

Separation of the oxime in solid form may also be circumvented in the case of oximes of high melting point such as cyclododecanone oxime and cyclotetradecanone oxime, by adding to the reaction mixture after the oximation reaction such an amount of inert solvent which is not miscible with water that the oxime passes into solution. The aqueous phase free from organic constituents is separated and the solvent is removed from the oxime solution by distillation, if necessary under subatmospheric pressure. The oxime solution may also be mixed with sulfuric acid at a temperature which is below the rearrangement temperature of the oxime. Two phases thus form. The lower phase contains the whole of the oxime dissolved in sulfuric acid and without further processing may be immediately heated to the favorable reaction temperature for the rearrangement of the oxime into the corresponding lactam. The solvent is separated from the sulfuric acid layer and returned to the oximation reaction without purification.

The process according to this invention may be easily carried out continuously. It is advantageous to work in two stages and to lead the ketone and the hydroxylamine solution countercurrent.

The invention is further illustrated by the following Examples in which the parts and percentages specified are by weight.

*Example 1*

54.6 parts of cyclododecanone and a solution of 29.4 parts of hydroxylammonium sulfate in 35 parts of water are mixed, heated under reflux while stirring and such an amount of 50% aqueous sodium hydroxide solution is added within five to ten minutes that pH 8 is reached. The reaction mixture is heated while stirring for another hour under reflux at 110° C., then allowed to cool and the deposited colorless oxime crystals filtered off with suction. They are washed with water until the filtrate running away is free from sulfate, and dried in a water jet vacuum at 50° to 60° C. until the weight is constant. 58.3 parts of colorless cyclododecanone oxime is obatined having a melting point of 131.5° to 132° C., corresponding to a yield of 98.8%. According to analysis by gas chromatography, the product contains 2.2% of cyclododecanone. Upon completion of the oximation reaction the aqueous phase contains 29% by weight sodium sulfate.

By working under otherwise identical conditions, but maintaining a pH value of 4, no oximation takes place whatever; 99% of the cyclododecanone is recovered unchanged. At pH 5, the crude oxime obtained contains 8.1% of cyclododecanone, at pH 6 4.0% and at pH 10 3.0% of cyclododecanone.

By working as described but carrying out the oximation at 60° to 65° C., 57.8 parts of cyclododecanone oxime is obtained having a melting point of 126° to 127° C. in which 10% of unreacted cyclododecanone can be detected.

By working as described but using 122.5 parts of water for dissolving the hydroxylammonium sulfate, 57.5 parts of cyclododecanone oxime having a melting point of 128° C. is obtained in which 5.0% of cyclododecanone is contained. Upon completion of the oximation reaction the aqueous phase contains 14.5% by weight sodium sulfate.

*Example 2*

A mixture of 36.4 parts of cyclododecanone and 16.7 parts of hydroxylammonium chloride dissolved in 13 parts of water is boiled while stirring and 50% aqueous sodium hydroxide solution is added until a pH of 7 to 8 has been reached. The reaction mixture is kept at 110° C. for one hour, allowed to cool and the procedure of Example 1 is then followed.

38.9 parts of cyclododecanone oxime having a melting point of 131° to 132° C. is obtained corresponding to a yield of 98.8%. The content of ketone in the product is 1.4%. Upon completion of the oximation reaction the aqueous phase contains 31% sodium chloride.

*Example 3*

A mixture of 54.6 parts of cyclododecanone and 29.4 parts of hydroxylammonium sulfate dissolved in 37 parts of water is boiled under reflux while stirring. Gaseous ammonia is passed in until a pH value of 8 has been reached, and the mixture heated for one hour at 105° to 110° C., the pH value of 8 being maintained by passing in a weak current of ammonia. The reaction mixture is cooled and the colorless crystals of cyclododecanone oxime are filtered off with suction, washed with water until they are free from sulfate and dried. 58.4 parts of cyclododecanone oxime having a melting point of 131° to 132° C. is obtained corresponding to a yield of 99.0%. The cyclododecanone oxime contains 2.5% of cyclododecanone. Upon completion of the oximation reaction the aqueous phase contains 36% ammonium sulfate.

If the experiment is repeated but the oximation is carried out at 70° C., the oxime prepared contains 4.8% initial material, and after three hours at 70° C. 3.3% of cyclododecanone. By working for three hours at 105° to 110° C., however, the content of ketone in the cyclododecanone oxime declines to 2.1%.

*Example 4*

Ammonia gas is passed while stirring into a mixture of 54.6 parts of cyclododecanone, 27.3 parts of cyclooctane, 29.4 parts of hydroxylammonium sulfate and 35 parts of water until a pH value of 8 has been reached. The mixture is then heated while stirring and a weak current of ammonia is passed in so that the pH value is maintained at 8, the whole being heated for one hour at 105° to 110° C., colorless crystals of cyclododecanone oxime thus being deposited.

81.9 parts of cyclooctane is then added to the reaction mixture, the whole stirred well until all the oxime crystals have passed into solution, and kept at 90° C. until the two phases have separated completely. The lower aqueous phase is separated; it contains 37.0% ammonium sulfate and at the most only traces of organic substances. The solution of cyclododecanone oxime in cyclooctane is freed from solvent by distillation under subatmospheric pressure. The cyclooctane is recovered almost without loss and may be used again without purification.

58.5 parts of colorless cyclododecanone oxime having a melting point of 132° to 133° C. remains as distillation residue; it contains only 0.14% of cyclododecanone. The yield is 99.5% of the theory. Cyclododecanone oxime having this purity can be rearranged by Beckmann rearrangement with concentrated sulfuric acid to very pure almost colorless laurolactam in yields of up to 98%.

If the oximation is carried out under the same conditions, but 10, 25, 100 or 165 parts of cyclooctane is added to 100 parts of cyclododecanone, an end product having a ketone content of 1.82%, 0.31%, 0.52% or 1.40% is obtained.

*Example 5*

Cyclododecanone is oximated as described in Example 4 but 27.3 parts of one of the other solvents set out in the following table is added instead of cyclooctane. The results given in the table are obtained:

TABLE 1

| Solvent | Temperature, °C. | Ketone content in percent in end product |
|---|---|---|
| Chloroform | 70 to 75 | 5.4 |
| Benzene | 70 to 75 | 1.5 |
| Toluene | 95 to 100 | 0.6 |
| Xylene | 103 to 108 | 0.3 |

Upon completion of the oximation the aqueous phase contains 37% ammonium sulfate.

*Examples 6 to 10*

The procedure of Example 1 is followed but larger amounts of water are used to dissolve the hydroxylammonium sulfate and various salts are added to set up the necessary concentration of salt at the end of the oximation reaction. The reaction conditions, as far as they differ from those used in Example 1, and the results obtained are specified in Table 2.

TABLE 2

| Example | 29.4 parts hydroxylammonium sulfate dissolved in 100 parts of | Salt concentration at end of reaction, percent | Parts of oxime | Ketone content in oxime |
|---|---|---|---|---|
| 6 | 26% aqueous potassium chloride solution. | 33.6 | 58.4 | 1.8 |
| 7 | 10% potassium sulfate solution. | 23.2 | 57.8 | 2.7 |
| 8 | 20% ammonium chloride solution. | 29.7 | 58.2 | 2.4 |
| 9 | 45% potassium acetate solution. | 46.1 | 58.0 | 2.2 |
| 10 | 30% magnesium sulfate solution. | 36.3 | 58.3 | 1.6 |

We claim:

1. A process for the production of oximes of cycloalkanones having at least twelve ring carbon atoms by the reaction of hydroxylamine and said cycloalkanone in an aqueous heterogeneous reaction mixture which comprises carrying out the reaction in the presence of such an amount of salt dissolved in the aqueous phase that the concentration of said salt in the aqueous phase on completion of the reaction is at least 10% by weight, and maintaining a temperature between 50° and 150° C. and a pH between 6 and 14.

2. A process as claimed in claim 1 wherein the concentration of the salt in the aqueous phase of the reaction mixture upon completion of the reaction is at least 15% by weight.

3. A process as claimed in claim 1 wherein the reaction temperature is 70 to 120° C.

4. A process as claimed in claim 1 wherein the pH is between 7 and 12 during the reaction.

5. A process as claimed in claim 1 wherein the reaction is carried out in the presence of an inert, organic solvent which is not miscible with water and which has a boiling point higher than 70° C.

6. A process as claimed in claim 1 wherein said salt is a water soluble salt having its cations selected from the group consisting of ammonium, sodium, potassium, calcium, barium, and magnesium and having its anions selected from the group consisting of chloride, sulfate, phosphate, monohydrogen phosphate, benzoate, and cations of aliphatic monocarboxy acids having 1–4 carbon atoms.

References Cited by the Examiner

UNITED STATES PATENTS

| 2,417,024 | 3/1947 | Tuerck et al. | |
| 2,442,854 | 6/1948 | Leffler et al. | 260—566 |
| 2,644,830 | 7/1953 | Pearl. | |
| 2,756,258 | 7/1956 | Wise | 260—566 |
| 2,820,855 | 1/1958 | Hillyer et al. | 260—566 |
| 2,822,394 | 2/1958 | Nicolaisen et al. | 260—566 |

OTHER REFERENCES

Blatt, "Organic Syntheses," collective vol. II, pp. 313–315 (1943).

Criegee, Ber. Deut. Chem., vol. 77, pp. 722–726 (1944).

Roberts et al., J.A.C.S., vol 73, pp 3176–3179 (1951).

CHARLES B. PARKER, *Primary Examiner.*

F. D. HIGEL, ROBERT V. HINES, *Assistant Examiners.*